US010865481B2

(12) United States Patent
Widmer et al.

(10) Patent No.: US 10,865,481 B2
(45) Date of Patent: Dec. 15, 2020

(54) COATINGS FOR TURBINE PARTS

(71) Applicant: General Electric Technology GmbH, Baden (CH)

(72) Inventors: Thomas Widmer, Esslingen (CH); Sven Olliges, Dübendorf (CH); Alexander Stankowski, Würenlingen (CH); Piero-Daniele Grasso, Niederweningen (CH); Mauro Melas, Baden (CH); Thomas Baumann, Wettingen (CH)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 820 days.

(21) Appl. No.: 15/046,533

(22) Filed: Feb. 18, 2016

(65) Prior Publication Data

US 2016/0160354 A1 Jun. 9, 2016

Related U.S. Application Data

(62) Division of application No. 14/135,764, filed on Dec. 20, 2013, now abandoned.

(30) Foreign Application Priority Data

Dec. 20, 2012 (EP) .................................... 12198707
Dec. 12, 2013 (EP) .................................... 13196979

(51) Int. Cl.
*C23C 18/54* (2006.01)
*C25D 15/00* (2006.01)
(Continued)

(52) U.S. Cl.
CPC ............ *C23C 18/54* (2013.01); *C09D 183/04* (2013.01); *C23C 18/1662* (2013.01);
(Continued)

(58) Field of Classification Search
CPC ... C23C 18/54; C23C 18/1662; C23C 28/027; C25D 15/00
See application file for complete search history.

(56) References Cited

U.S. PATENT DOCUMENTS 6,346,294 B1 2/2002 Reiss et al.
6,623,241 B2 9/2003 Blangetti et al.
(Continued)

FOREIGN PATENT DOCUMENTS

CN 101956187 A 1/2011
DE 2522130 B1 10/1976
(Continued)

OTHER PUBLICATIONS

Harper, C. A., "Electronic Materials and Processes Handbook," 3rd Ed, Chapter 1, pp. 1.36 (2003).
(Continued)

*Primary Examiner* — Nathan H Empie
(74) *Attorney, Agent, or Firm* — Grogan, Tuccillo & Vanderleeden, LLP

(57) ABSTRACT

A method and a turbine part having a coating with a matrix layer that includes a high temperature resistant hydrophobic polysiloxane filler, wherein the coating has superior mechanical strength and temperature resistance.

18 Claims, 2 Drawing Sheets

(51) Int. Cl.
  *C23C 30/00* (2006.01)
  *C23C 28/02* (2006.01)
  *C23C 18/16* (2006.01)
  *C25D 5/50* (2006.01)
  *F01D 5/28* (2006.01)
  *C09D 183/04* (2006.01)
  *C23C 18/36* (2006.01)
  *C25D 3/12* (2006.01)

(52) U.S. Cl.
  CPC ........ *C23C 18/1692* (2013.01); *C23C 28/027* (2013.01); *C23C 30/00* (2013.01); *C25D 5/50* (2013.01); *C25D 15/00* (2013.01); *F01D 5/288* (2013.01); *C23C 18/36* (2013.01); *C25D 3/12* (2013.01); *F05D 2230/31* (2013.01); *F05D 2230/80* (2013.01); *Y02T 50/60* (2013.01); *Y10T 428/31663* (2015.04)

(56) References Cited

U.S. PATENT DOCUMENTS

| | | | |
|---|---|---|---|
| 6,638,572 B1 * | 10/2003 | Inglefield | B22C 9/00 264/117 |
| 7,150,904 B2 | 12/2006 | D'Urso et al. | |
| 8,088,440 B2 | 1/2012 | Luten | |
| 2005/0008780 A1 * | 1/2005 | Ackerman | C23C 10/08 427/252 |
| 2007/0298256 A1 * | 12/2007 | Fukui | C08L 83/04 428/402.24 |
| 2008/0152506 A1 | 6/2008 | Schreiber | |
| 2009/0298369 A1 | 12/2009 | Koene et al. | |
| 2010/0247321 A1 | 9/2010 | Kulkarni et al. | |
| 2011/0165433 A1 | 7/2011 | Pabla et al. | |
| 2014/0178699 A1 * | 6/2014 | Widmer | C23C 18/1662 428/447 |

FOREIGN PATENT DOCUMENTS

| | | |
|---|---|---|
| DE | 10 2006 044 956 A1 | 4/2008 |
| EA | 200601474 A1 | 2/2007 |
| EP | 1 780 379 A2 | 5/2007 |
| EP | 1 870 485 A1 | 12/2007 |
| EP | 2 233 534 A1 | 9/2010 |
| SU | 1027181 A | 7/1983 |
| WO | WO 2008/052510 A1 | 5/2008 |
| WO | WO 2010/066648 A1 | 6/2010 |
| WO | WO 2011/039075 A1 | 4/2011 |

OTHER PUBLICATIONS

Heilen, W., "Silicone resins and their combinations," Degussa, Tego Chemie, pp. 41-43 (2005).
Koene, B.E., et al., "Self healing superhydrophobic coatings for corrosion protection," DoD Corrosion conference, pp. 1-8 (2009).
Noll, W., "Chemistry and technology of silicones," Properties of Technical Products, Chapter 9, pp. 447-452 (1968).
Ming, W., et al., "Superhydrophobic Films from Raspberry-Like Particles," Nano Letters, vol. 5, No. 11, pp. 2298-2301 (2005).
Varanasi, K.K., et al., "Controlling Nucleation and Growth of Water Using Hybrid Hydrophobic-Hydrophilic Surfaces," Faraday Discussions, in Proceedings of the 12th IEEE Intersociety Conference on Thermal and Thermomechanical Phenomena in Electronic Systems (ITherm), IEEEITHERM, IHTC, pp. 1-5 (2010).
Yin, B., et al., "Preparation and properties of super-hydrophobic coating on magnesium alloy," Applied Surface Science, vol. 257, Issue 5, pp. 1666-1671 (Dec. 15, 2010).
Unofficial English Translation of Decision to Grant issued in connection with corresponding RU Application No. 2013156624 dated Aug. 16, 2016.
Kanani, "Chemisches Vernickeln" E.G. Leuze Verlag 2007 (ISBN 978-3-87480-229-1) p. 510-513.
Wang et al., "Electrochemical Preparation and Characterization of Nickel/Ultra-Dispersed PTFE Composite Filmsfrom Aqueous Solution", Materials Transactions, vol. 45, No. 4, 2004, pp. 1311-1316.
G. Mallory and J. Hajdu: Electroless Plating: Fundamentals and Applications, (Noyes Publications William Andrew Publishing, LLC, New York 1990) pp. 276 and 277.
Merriam Webster definition of "disperse", Internet Retrieval date of Jun. 4, 2015, http://www.merriamwebster.com/dictionary/disperse.
Office action issued from Chinese Patent Office dated Jul. 20, 2015 for CN Application No. 201310707883.5.

* cited by examiner

COATINGS FOR TURBINE PARTS

CROSS-REFERENCE TO RELATED APPLICATIONS

This application is a divisional application of U.S. patent application Ser. No. 14/135,764, which claims priority to European application 13196979.2 filed Dec. 12, 2013, which in turn claims priority to European application 12198707.7 filed Dec. 20, 2012, both of which are hereby incorporated in their entireties.

TECHNICAL FIELD

The invention relates to the coating of turbine parts, particularly the blades of a low-pressure steam turbine, and to a long-lasting coating with hydrophobic properties for such parts.

BACKGROUND

In the following description the term "turbine" is used to refer to rotary engines having a stator and a rotating part force coupled by a fluid medium such as water or gas. Of particular interest for the present invention are axial turbines comprising radially arranged fixed stator blades or vanes alternating with radially arrangements of moving rotor blades. Movements are generally registered as movements relative to a casing or housing.

In a large steam turbine, the pressurized steam is typically expanded across several stages of the turbine, respectively referred to as high pressure, intermediate pressure and low pressure stage of the turbine. In the low pressure stage the steam is expanded and cooled close to a point of condensation and exhausted into a condenser. The relative wetness of the steam at the last stage of the low pressure stage may result in droplet erosion and other potential sources of performance losses as well as material degradation due to water droplet impact, requiring a need for additional spare parts to be exchanged.

As described in the co-owned U.S. Pat. No. 6,623,241 incorporated herein in its totality by reference, the expansion of the turbine steam in a low-pressure turbine to condenser pressure usually results in a range for wet steam. The mass content of the condensation water in the wet waste steam can be up to 14%. The impulse of the entire mass stream of the turbine steam is preserved, independently from the condensation water content. However, the presence of a liquid phase in the rotating and stationary elements of the turbines may result in increased dissipative losses. In a so-called low-pressure turbine, about 12-14% of the mass stream can be generated in the form of water. This moisture loss can result in a loss of efficiency of the low-pressure turbine of approximately 6-7%, which corresponds to a loss of efficiency of approximately 1-2% of an entire steam power plant. In combined cycle and non-conventional power plants, the contribution of power of the low-pressure turbine in relation to the overall plant power is slightly higher by comparison, so that the loss in overall efficiency due to moisture losses may be between 2-2.3% or 3-3.5% overall.

The extent of losses depends for the most part on the size of the water drops. In most cases, only small drops, in the range of micrometers, are contained in the steam phase. According to the newest understanding, these drops maintain their size and do not coalesce into larger drops as long as they keep floating or flowing in the steam. Similar to a vapour, they flow along with the steam flow that exerts an impulse onto the blades. As long as the drops remain in this small size range, they do not have an adverse effect on either the operation or on the performance of the turbine. However, as they flow through the guide blades and rotating blades, the drops grow. It is believe that during the contact with metal surfaces, in particular when contacting the concave metal surfaces of the guide blades, small condensate droplets spread on the surface and form a closed condensate film that flows on the guide blades over the concave or convex surfaces, subject to the effect of the shearing forces of the steam. At the trailing edge of the guide vane, the fluid film leaves the surface where it accelerates and is divided by rotating bucket wheels. The drops generated by this division have a larger diameter than the drops created by spontaneous condensation.

By centrifugal forces, these larger drops are spun outward by the rotating blades, towards the turbine housing. This means that a part of the impulse of the working medium is not transferred onto the blades, which results in a moisture loss that reduces the degree of efficiency of the low-pressure turbine. This phenomenon increases as the size and mass and thus the centrifugal force of the droplets increase. Furthermore, accumulation of water on the inside surfaces of the housing of the low-pressure turbine results in dissipative friction losses on the rotating vane tips and vane covers. Finally, enlarged drops with diameters in the range from 100-200 microns and speeds in the range of more than 250 m/s cause erosion due to the impact of the drops. This erosion depends greatly on the specific materials, whereby vane materials of titanium and titanium alloys, which are used preferably for the large blades of the low-pressure turbine, are especially susceptible.

Attempts have been made to provide vane blades of turbines with a coating that increase the erosion resistance of the blades, thus extending their useful life. The above-referenced '241 patent describes a number of different coatings for the blades of a steam turbine that consists of a hard, wear-resistant material on a substrate.

To increase the size of the low pressure turbine, particularly of the blades mounted for the last stage of a low pressure turbine it has been proposed to replace steel or titanium as basic blade material by composites such as carbon fiber based materials. Though a large number of such designs have been published, real-world applications of such composite blades are currently limited to gas turbines for advanced aircrafts engines.

One of the reasons which so far prevented large-scale adoption of composite blades in the field of electrical power generation is the lack of resistance of the composite materials to the erosion processes as described above. Under the constant bombardment of the condensate from the water steam, composite material erodes much faster than the currently applied metal alloys and is thus are not suitable as airfoil material for large steam turbine blades.

For composite blades, protective layers are described for example in the published United States patent application US 2008/0152506 A1 and the published international patent applications WO 2011/039075 A1 and WO 2010/066648.

In the United States published patent application no. 2009/0298369 A1, coatings and methods are described including the use of hydrophobically activated particles incorporated into a polymeric coating material wherein the coating servers as a matrix to bind the particles to an underlying substrate. Pg 3 § 38 maybe homogenously distributed In view of the known efforts in the field of hard-wearing coatings for turbine parts, it can be seen as one object of the present invention to provide a coating and a coating process suited for large parts of a steam turbine particularly the blades within a low pressure turbine or stage.

SUMMARY OF THE INVENTION

According to an aspect of the present invention, provided is a coating with hydrophobic filler whose properties can be adjusted to withstand the working temperature. This is general achieved by the hydrophobic filler being a polysiloxane that is stoveable to achieve a required temperature resistance/hydrophobicity balance.

An aspect provides a coating for axially rotating machine part that in use is subject to water laden gas, the coating having a metal matrix with poly-siloxane filler.

In an aspect the coating is a metal matrix material comprising Nickel or alloys thereof.

In an aspect the polysiloxane filler have a size distribution as measured by laser diffraction of d10=0.37 micrometres, D50=1.07 micrometres and D90=2.31 micrometres. In a variant, filler 14 include fibrous, platelets, spheres or other particle shapes.

In an aspect the filler comprises preferably between 5 to 50 volume % of the coating, more preferably between 25 to 45 volume % and most preferably between 35 to 45 volume percent of the coating.

In an aspect the coating has a corrosion resistant inner layer free of filler and the metal matrix of other aspects forms an outer layer of coating.

In an aspect the part is an airfoil of a steam turbine.

In another aspect, the part is an airfoil of a gas compressor of a gas turbine.

An aspect provides a method for coating a part for an axially rotating machine a coating with erosion resilience and hydrophobic properties, the method including the steps of:
providing a part of an axially rotating machine
coating the part with a coating comprising a metal matrix with a hydrophobic material filler made of polymeric ceramic precursor, homogeneously distributed throughout the thickness of the metal matrix; and
subjecting the filler, either before or after the coating step, to a controlled partial pyrolysis step so that the filler partially retains both ceramic and polymeric properties.

In an aspect the method of coating includes the process of electrolytic nickel plating.

The thickness of a layer of the metal matrix on a substrate, which may be made Nickel or Titanium, is typically in the range of 10-300 microns. And the substrate or base material to which the coating is applied can include carbon steels, chromium nickel steels, titanium based materials and composite materials. These materials are used for example in static and rotating vanes or blades for turbines, which can be larger in height than 1 m.

These and further aspects of the invention will be apparent from the following detailed description and drawings as listed below. For example, the coating of various embodiments of this invention allows local restoration of the coating following in service erosion without removal in either a mounted or a dismounted state and thus provides a simple and cost effective solution.

BRIEF DESCRIPTION OF THE DRAWINGS

Exemplary embodiments of the invention will now be described, with reference to the accompanying drawing, in which.

DETAILED DESCRIPTION

Throughout this specification the following terms have the following definitions "Hydrophobic" is defined as a material with a contact angle, as measured by the static sessile drop method, between a solid surface of the material and a water droplet of greater than 90 degrees.

Siloxanes are defined as a functional group in organic silicon chemistry that has a Si—O—Si linkage. Siloxanes include polymeric hydrides, referred to as silicones or polysiloxanes that have the formulae H3—Si—[O—SiH2]n-O—SiH3 wherein hydrogen atoms may be substituted by halogens or organic groups.

The temperature resistance of specific polysiloxanes can be varied by varying the degree of cross linking and pyrolysis/hydrolysis in which there is a successive replacement of carbon containing end groups with oxygen to form $SiO_2$. The result is an increase in the ceramic ($SiO_2$) to organic ratio of the polysiloxane which increases the temperature resistance but typically has a detrimental effect on hydrophobicity.

Figure 1:
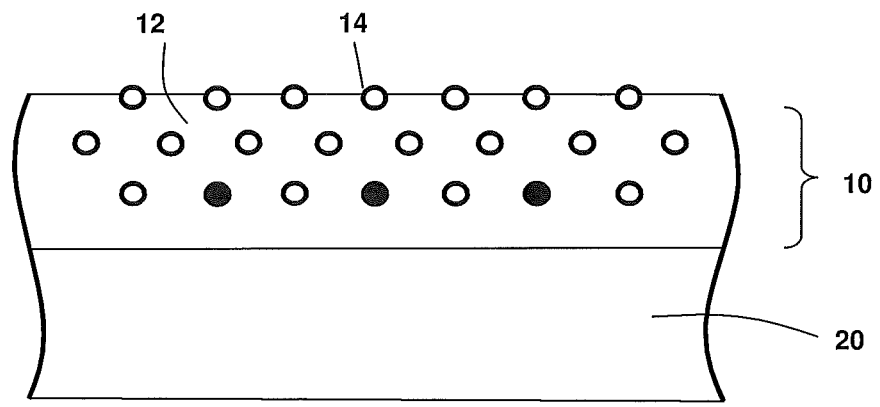
FIG. 1 presents a cut view of a steam turbine part showing a coating of an exemplary embodiment of the invention.

FIG. 1 shows a coating 10 of an exemplary embodiment a of coating 10 that at least partially coats an axially rotating machine part 20 subject to water droplet impact, wherein the coating 10 comprises a metal matrix 12 having polysiloxane distributed filler 14. Such plants include steam turbine plants and axial flow compressors that are part of a gas turbine plant, in particular gas turbine plants that are configured with water injection means upstream of the compressor. The suitability of the coating 10 for axial rotating machines is a result of the coating's 10 erosion resistance, temperature resilience and pH tolerance. For this reason exemplary embodiment are particular suitable for use in either steam turbines or compressors. The invention is not however limited to these machines and may alternatively be used in any high temperature moist environments where the coating 10 is required to provide erosion protection through hardness and temperature resistance and hydrophobic properties by the incorporation of hydrophobic filler particles.

An effect of the filler 14 being homogenously distributed in the coating 10 is that this ensures that during the inevitable erosion of the coating, which occur in the aggressive environments of steam turbines and compressors in regions where moisture is present despite materials, such as like Titanium and Nickel alloys, the problem of erosion still exists.

In different exemplary embodiments, the filler 14 may be fibrous, have a platelet, spherical or other shape. In each case, the size distribution as measured by laser diffraction, preferably is d10=0.37 micrometres, D50=1.07 micrometres and D90=2.31 micrometres. The loading of the metal matrix 12 is in the range of 5 to 50 vol %, preferably in the range of 25 to 45 vol %, most preferably in the range of 35 to 45 vol %.

In an exemplary embodiment the coating includes more than one type of filler 14, wherein the definition of type includes shape, size, material and degree of crosslinking/pyrolysis/hydrolysis.

Figure 2:
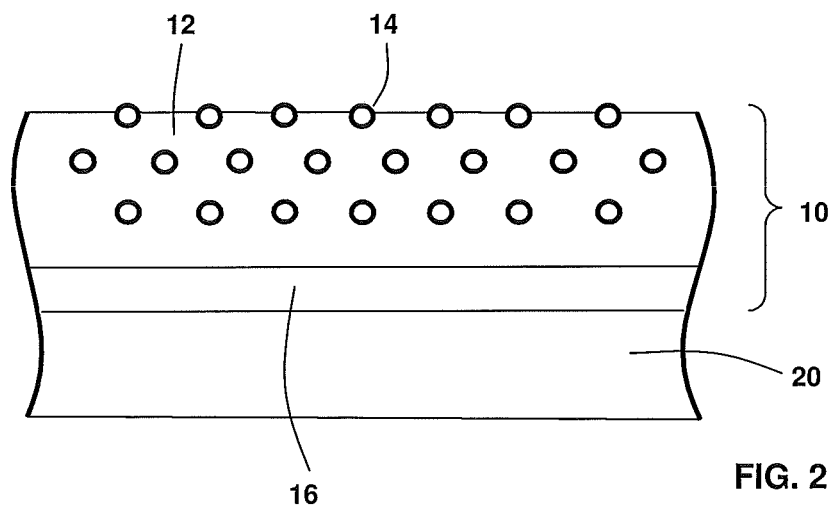
FIG. 2 is a cut view of the part and coating of FIG. 1 further including an inner and an outer coating layer.

An exemplary embodiment shown in FIG. 2 the coating 10 includes an erosion resistant inner layer 16 and an outer layer 12, wherein the inner layer 16 is sandwiched between the outer layer 12 and the machine part 20. A purpose of the inner layer 16 is to protect the machine part 20 in the case of erosion of the outer layer 12.

Figure 3:
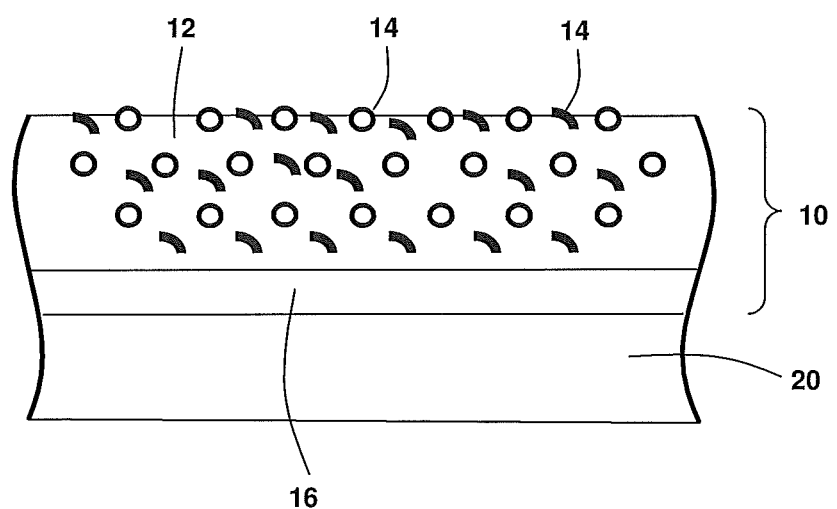
FIG. 3. Is a cut view of the part and coating of FIG. 2 further including a filler.

In an exemplary embodiment shown in FIG. 3, the particles may be spherical particles, flake shaped particles, a combination of spherical and flaked shaped particles.

In an exemplary embodiment the coating 10 may be applied to the machine part 20, or alternatively the inner layer 16, using a Electrolytic Nickel-Phosphorus coating method using a method adapted from the known electrolytic Ni—P-PTFE coating method described, for example, in "Chemisches Vernickeln", author: N. Kanani, E. G. Leuze Verlag 2007 (ISBN 978-3-87480-229-1) pg. 510-513. The method includes the process steps of chemically reducing Nickel in a reducing agent in which filler 14 particles are homogenously suspended with the assistance of a wetting agent. In this way, filler 14 particles are homogenously distributed within the Nickel coating 10 as it is deposited on the machine part 20.

In another exemplary embodiment, the coating 10 is be applied my means of chemical electroless Nickel plating, as is known in the art.

In a further exemplary embodiment, the coating 10 is applied using a multi-layer principle in which layers are applied by different methods, for example either chemical electroless Nickel plating and Electrolytic Nickel coating.

In an exemplary method that can be applied a coating containing poly-siloxane filler 14 controlled stoving is used to tailor the filler temperature resistance/hydrophobic properties. The actual stoving temperature required is not uniform but instead needs to be matched to the required end use of the coating in consideration of the presence of catalytic substances such as acids, tin and titanium compounds that affect the degree of crosslinking/pyrolysis/hydrolysis and the actual composition and form of the polysiloxane. A particular advantage of the tailoring of polysiloxanes compared to alternative polymeric hydrophobic filler 14 is that the tailoring makes it possible to produce coatings with polymeric hydrophobic fillers particles that are suitable for application where temperatures exceed 400° C. or even 500° C. The method entails stoving a component have a coating containing a filler of polysiloxane particles such that the temperature resistance of the filler is increased. In an exemplary embodiment, this is done after the filler 14 is embedded into the metal matrix 12, for example, during heat treatment of the machine part 20, carried out, for example, for the purpose of improving the adhesion properties of the coating to the machine part 20. In another exemplary embodiment the stoving step is completed before embedding the filler 14 into the metal matrix 12. This may be done, for example when the staving step significantly changes the density of the filler 14. In this way, any shrinkage of the filler 14 as a result of pyrolysis occurs before it is embedded in the metal matrix 12.

Such coatings and method can advantageously be used in steam turbine coatings, in particularly low pressure steam turbines as a fog rejecting coating in order to lower/avoid losses caused by condensation of steam.

The present invention has been described above purely by way of example, wherein modifications can be made within the scope of the invention. The invention may also comprise any individual features described or implicit herein or shown or implicit in the drawings or any combination of any such features or any generalisation of any such features or combination, which extends to equivalents thereof. For example, although described exemplary embodiments of the hydrophobic filler exclusively comprise polysiloxane particles, polysiloxane particles may be used in combination with other hydrophobic particles including, for example, those based on CFx. Thus, the breadth and scope of the present invention should not be limited by any of the above-described exemplary embodiments. Alternative features serving the same, equivalent or similar purposes may replace each feature disclosed in the specification, including the drawings, unless expressly stated otherwise.

Unless explicitly stated herein, any discussion of the prior art throughout the specification is not an admission that such prior art is widely known or forms part of the common general knowledge in the field.

The invention claimed is:

1. A method for coating a part for an axially rotating machine with an erosion resilient coating, the method comprising:
   providing a part of an axially rotating machine;
   coating the part with a coating comprising a metal matrix having an embedded polysiloxane filler distributed throughout a thickness of the metal matrix; and
   stoving the part with the coating employing a controlled process to tailor at least one of a temperature resistance and hydrophobic property of the polysiloxane filler, the controlled process employing a temperature that varies and is selected based at least in part on a required end use of the coating, a specific composition and form of the polysiloxane filler, and a presence of any catalytic substances; wherein the controlled process employs a temperature selected such that controlled partial pyrolysis results in successive replacement of carbon containing end groups with oxygen to form SiO2, yielding an increase in the ceramic (SiO2) to organic ratio of the polysiloxane filler to affect temperature resistance and hydrophobicity.

2. The method of claim 1 wherein the method of coating includes electrolytic nickel plating and/or electroless chemical coating.

3. The method of claim 1 wherein the method of coating comprises electrolytic nickel plating.

4. The method of claim 1 wherein the method of coating comprises electroless chemical coating.

5. The method of claim 1 wherein the coating the part with the coating results in a coating comprising an outer layer and an inner layer, the inner layer configured to be between the axially rotating machine part and the outer layer.

6. The method of claim 5 wherein the outer layer has the metal matrix comprising the polysiloxane filler distributed throughout an entire thickness of the outer layer.

7. The method of claim 6 wherein prior to coating the part with a coating comprising a metal matrix having an embedded polysiloxane filler, coating the part with a corrosion resistant layer that does not have any of the polysiloxane filler such that the polysiloxane filler is only within the outer layer of the coating.

8. The method of claim 7 wherein the controlled process further including ensuring that the polysiloxane filler undergoes controlled partial pyrolysis such that the polysiloxane filler includes polymeric hydrophobic filler particles operative to withstand temperatures exceeding 400° C.

9. The method of claim 1 wherein the controlled process further including ensuring that the polysiloxane filler undergoes controlled partial pyrolysis such that the polysiloxane filler includes polymeric hydrophobic filler particles operative to withstand temperatures exceeding 400° C.

10. The method of claim 1 wherein the metal matrix comprises Nickel or alloys thereof.

11. The method of claim 1 wherein the polysiloxane filler has a form of particles.

12. The method of claim 11 wherein the particles have a size distribution as measured by laser diffraction of d10=0.37 micrometers, D50=1.07 micrometers and D90=2.31 micrometers.

13. The method of claim 11 further including distributing the particles homogenously throughout a thickness of the coating.

14. The method of claim 1 wherein the polysiloxane filler comprises between 5 volume % to 50 volume % of the coating.

15. The method of claim 1 wherein the polysiloxane filler comprises between 25 volume % to 45 volume % of the coating.

16. The method of claim 1 wherein the polysiloxane filler comprises between 35 volume % to 45 volume % of the coating.

17. The method of claim 1 wherein the polysiloxane filler includes hydrophobic filler particles, wherein the filler particles are at least one of fibrous, flakes, platelet shaped, and spherical shaped.

18. A method for coating a part for an axially rotating machine with an erosion resilient coating, the method comprising:

providing a part of an axially rotating machine;

coating the part with a coating comprising a metal matrix having an embedded polysiloxane filler distributed throughout a thickness of the metal matrix; and stoving the part with the coating employing a controlled process to tailor a temperature resistance and hydrophobic property of the polysiloxane filler, the controlled process employing a temperature that varies and is selected based at least in part on a required end use of the coating, a specific composition and form of the polysiloxane filler, and a presence of any catalytic substances; wherein the controlled process employs a temperature selected such that controlled partial pyrolysis results in successive replacement of carbon containing end groups with oxygen to form SiO2, yielding an increase in the ceramic (SiO2) to organic ratio of the polysiloxane filler to affect temperature resistance and hydrophobicity.

\* \* \* \* \*